(12) United States Patent
Zhang

(10) Patent No.: US 11,374,401 B2
(45) Date of Patent: Jun. 28, 2022

(54) OVERVOLTAGE ABSORPTION CIRCUIT AND SINGLE-PHASE HERIC TOPOLOGY

(71) Applicant: Sungrow (Shanghai) Co., Ltd., Shanghai (CN)

(72) Inventor: Peng Zhang, Shanghai (CN)

(73) Assignee: Sungrow (Shanghai) Co., Ltd., Shanghai (CN)

( * ) Notice: Subject to any disclaimer, the term of this patent is extended or adjusted under 35 U.S.C. 154(b) by 17 days.

(21) Appl. No.: 16/997,571

(22) Filed: Aug. 19, 2020

(65) Prior Publication Data

US 2021/0057907 A1 Feb. 25, 2021

(30) Foreign Application Priority Data

Aug. 21, 2019 (CN) .......................... 201921360218.2

(51) Int. Cl.
*H02H 7/122* (2006.01)
*H02H 9/04* (2006.01)
*H02M 1/34* (2007.01)
*H02M 7/5387* (2007.01)

(52) U.S. Cl.
CPC .......... *H02H 9/042* (2013.01); *H02H 7/1225* (2013.01); *H02H 9/044* (2013.01); *H02M 1/34* (2013.01); *H02M 7/5387* (2013.01); *H02M 1/344* (2021.05)

(58) Field of Classification Search
CPC .... H02H 7/1225; H02H 7/122; H02H 7/1222; H02H 9/042; H02H 9/044; H02H 9/047; H02H 9/043; H02M 7/5387; H02M 1/34; H02M 1/344
See application file for complete search history.

(56) References Cited

U.S. PATENT DOCUMENTS

| | | | |
|---|---|---|---|
| 2015/0318690 A1* | 11/2015 | Eckel | H02M 7/49 361/93.1 |
| 2017/0040999 A1* | 2/2017 | Schneider | H03K 17/72 |
| 2021/0083563 A1* | 3/2021 | Okawauchi | H02M 3/158 |

* cited by examiner

*Primary Examiner* — Nguyen Tran
(74) *Attorney, Agent, or Firm* — Harness, Dickey & Pierce, P.L.C.

(57) ABSTRACT

An overvoltage absorption circuit and a single-phase HERIC topology are provided. The overvoltage absorption circuit is applicable to the single-phase HERIC topology, and includes a clamping capacitor, an absorption resistor, a first diode, and a second diode. One terminal of the clamping capacitor and one terminal of the absorption resistor are each connected to collectors of two cross transistors in the single-phase HERIC topology. The other terminal of the clamping capacitor and the other terminal of the absorption resistor are each connected to the anodes of the first diode and the second diode. The cathode of the first diode is connected to the emitter of one of the two cross transistors. The cathode of the second diode is connected to the emitter of the other of the two cross transistors.

17 Claims, 8 Drawing Sheets

OVERVOLTAGE ABSORPTION CIRCUIT AND SINGLE-PHASE HERIC TOPOLOGY

The present application claims priority to Chinese Patent Application No. 201921360218.2, titled "OVERVOLTAGE ABSORPTION CIRCUIT AND SINGLE-PHASE HERIC TOPOLOGY", filed on Aug. 21, 2019, with the China National Intellectual Property Administration, which is incorporated herein by reference in its entirety.

FIELD

The present disclosure relates to the field of integrated circuits, and in particular to an overvoltage absorption circuit and a single-phase HERIC topology.

BACKGROUND

An inverter is an important component in a photovoltaic grid-connected system. Performance of the inverter directly affects operation status of the photovoltaic grid-connected system. In an existing overvoltage absorption circuit based on a HERIC topology, an RC type or RCD type circuit structure is used to absorb overvoltage generated by two cross transistors in the HERIC topology.

In an existing RC type overvoltage absorption circuit, as shown in FIG. 1, the two cross transistors in the HERIC topology are a third power transistor Q3 and a fourth power transistor Q4. An overvoltage generated by the third power transistor Q3 is absorbed by an absorption circuit formed by a resistor R390 and a capacitor C1. One terminal of the resistor R390 is connected to a collector (C) of the third power transistor Q3. The other terminal of the resistor R390 is connected to one terminal of the capacitor C1. The other terminal of the capacitor C1 is connected to an emitter (E) of the third power transistor Q3. An overvoltage generated by the fourth power transistor Q4 is absorbed by an absorption circuit formed by a resistor R392 and a capacitor C2. One terminal of the resistor R392 is connected to a collector of the fourth power transistor Q4. The other terminal of the resistor R392 is connected to one terminal of the capacitor C2. The other terminal of the capacitor C2 is connected to an emitter of the fourth power transistor Q4. The overvoltage absorption circuit connected as the above has a simple structure and high reliability. However, absorption effect of the overvoltage absorption circuit connected as the above is limited. Since an absorption loss is proportional to the absorption effect, the absorption loss and the absorption effect are difficult to be balanced during use. Further, the resistor R390 and the resistor R392 may be heated severely, which may result in a low conversion efficiency of the system.

SUMMARY

In view of the above disadvantages in the conventional technology, an object of the present disclosure is to provide an overvoltage absorption circuit and a single-phase HERIC topology, to overcome the difficulty in balancing the absorption loss and the absorption effect and solve the problem of a low conversion efficiency of the system due to severe heating of resistors when using the existing overvoltage absorption circuit.

In order to achieve the above object, the following technical solutions are provided according to embodiments of the present disclosure.

In a first aspect of the present disclosure, an overvoltage absorption circuit is provided. The overvoltage absorption circuit is applied to a single-phase HERIC (highly efficient and reliable inverter concept) topology and includes a first diode, and a second diode and a first sub-circuit including a clamping capacitor and an absorption resistor connected in parallel with each other. The first sub-circuit has a first terminal connected to a first point of common coupling (PCC) of a first cross transistor and a second transistor in the single-phase HERIC topology, and a second terminal connected to a second point of common coupling of the first diode and the second diode. The first diode has a third terminal connected to the second point of common coupling, and a fourth terminal that is connected to the first cross transistor and further connected to the first point of common coupling through the first cross transistor. The second diode has a fifth terminal connected to the second point of common coupling, and a sixth terminal that is connected to the second cross transistor and further connected to the first point of common coupling through the second cross transistor.

In an embodiment, in the above overvoltage absorption circuit, the third terminal of the first diode is an anode of the first diode, and the fourth terminal of the first diode is a cathode of the first diode; the fifth terminal of the second diode is an anode of the second diode, and the sixth terminal of the second diode is a cathode of the second diode; the cathode of the first diode is connected to an emitter of the first cross transistor, and the cathode of the second diode is connected to an emitter of the second cross transistor; and the first terminal of the first sub-circuit is connected to a collector of the first cross transistor and a collector of the second cross transistor through the first point of common coupling.

In an embodiment, in the above overvoltage absorption circuit, the third terminal of the first diode is a cathode of the first diode, and the fourth terminal of the first diode is an anode of the first diode; the fifth terminal of the second diode is a cathode of the second diode, and the sixth terminal of the second diode is an anode of the second diode; the anode of the first diode is connected to a collector of the first cross transistor, and the anode of the second diode is connected to a collector of the second cross transistor; and the first terminal of the first sub-circuit is connected to an emitter of the first cross transistor and an emitter of the second cross transistor through the first point of common coupling.

In an embodiment, the above overvoltage absorption circuit further includes a first resistor and a second resistor. One terminal of the first resistor is connected to the anode of the first diode, and the other terminal of the first resistor is connected to the second point of common coupling. One terminal of the second resistor is connected to the anode of the second diode, and the other terminal of the second resistor is connected to the second point of common coupling.

In an embodiment, the above overvoltage absorption circuit further includes a third resistor and a fourth resistor. One terminal of the third resistor is connected to the cathode of the first diode, and the other terminal of the third resistor is connected to the second point of common coupling. One terminal of the fourth resistor is connected to the cathode of the second diode, and the other terminal of the fourth resistor is connected to the second point of common coupling.

In an embodiment, in the above overvoltage absorption circuit, the clamping capacitor includes two capacitors connected in parallel.

In an embodiment, in the above overvoltage absorption circuit, the absorption resistor includes multiple resistors connected in series.

In an embodiment, each of the first diode and the second diode is a silicon carbide (SIC) diode, or a fast recovery diode.

In a second aspect of the present disclosure, a single-phase HERIC topology is provided, which includes: a first bridge arm and a second bridge arm, where the first bridge arm includes a first power transistor and a fifth power transistor, and the second bridge arm includes a second power transistor and a sixth power transistor; a first cross transistor and a second cross transistor that are connected in series between intermediate points of the first and second bridge arms; and the overvoltage absorption circuit according to any one of the above.

In an embodiment, in the above single-phase HERIC topology, each of the first power transistor, the second power transistor, the fifth power transistor, the sixth power transistor, the first cross transistor and the second cross transistor is an insulated gate bipolar transistor (IGBT) or a metal oxide semiconductor (MOS) field effect transistor.

Compared with conventional technology, in case of the same absorption performance, the operating loss by the technical solution according to the present disclosure is significantly less than that in the conventional technology, because the loss by the technical solution according to the present disclosure is mainly spike energy with substantially no additional loss while the conventional absorption circuit has additional loss that is inevitable. Therefore, the present disclosure provides significant technical advantages.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

An overvoltage absorption circuit is provided according to the present disclosure, and is applied to a single-phase HERIC topology, to overcome the difficulty in balancing the absorption loss and the absorption effect and solve the problem of a low conversion efficiency of the system due to severe heating of resistors when using the existing overvoltage absorption circuit.

Figure 1:
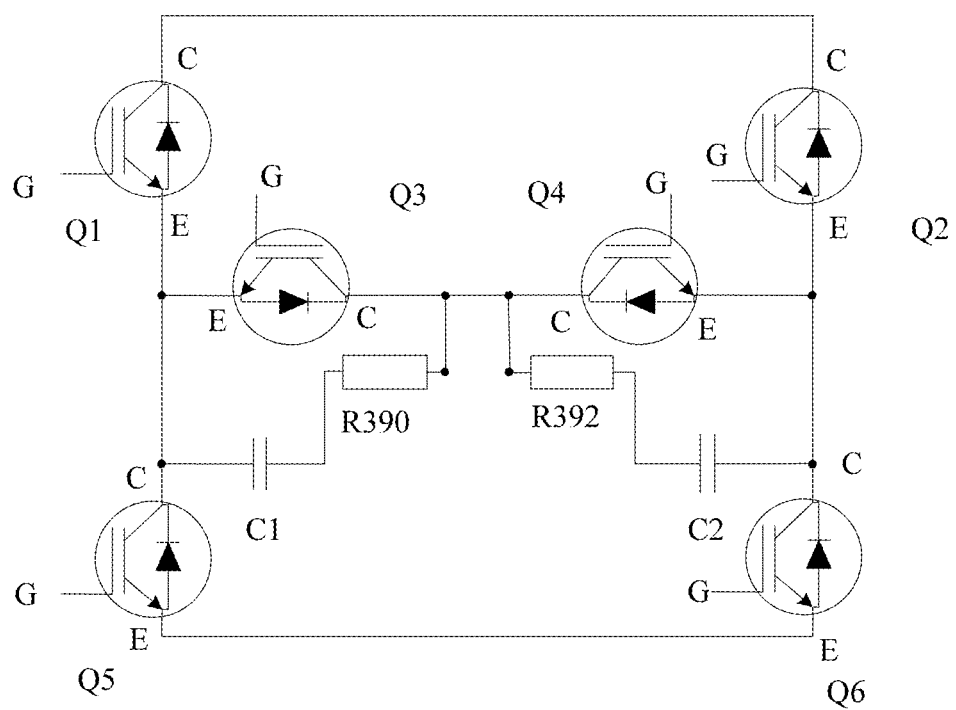
FIG. 1 shows an existing RC type overvoltage absorption circuit.
Figure 2:
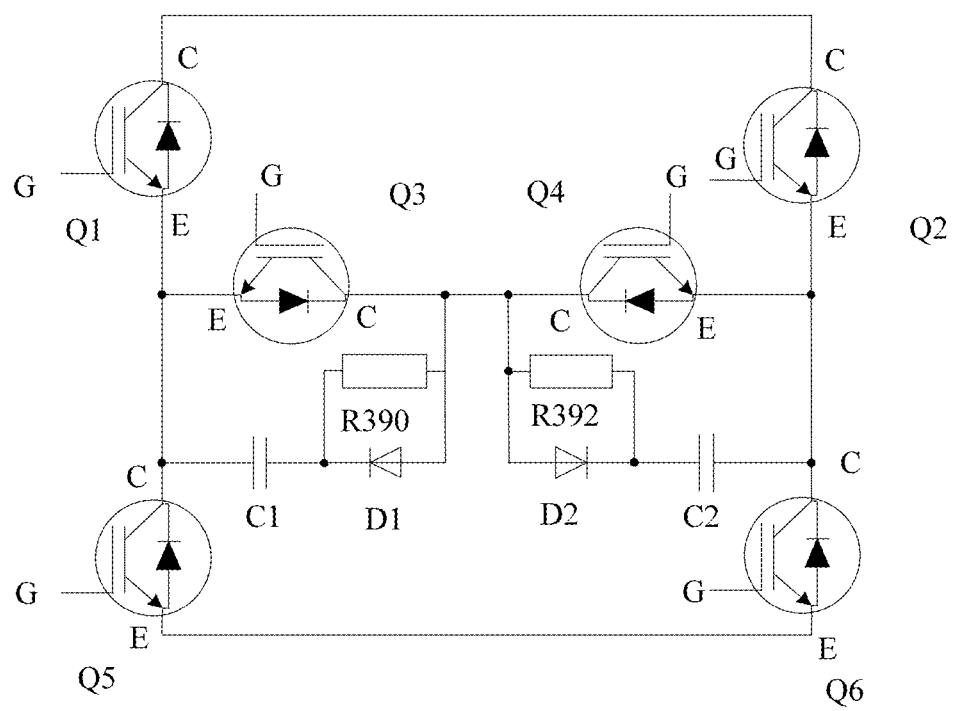
FIG. 2 shows an existing RCD type overvoltage absorption circuit.

It should be noted that reference can be made to FIG. 1 or FIG. 2 for a structure of a single-phase HERIC topology circuit. The single-phase HERIC topology circuit includes a first power transistor Q1, a second power transistor Q2, a third power transistor Q3, a fourth power transistor Q4, a fifth power transistor Q5 and a sixth power transistor Q6. The two cross transistors in the single-phase HERIC topology referred to in the present disclosure are the third power transistor Q3 and the fourth power transistor Q4.

It should further be noted that the third power transistor Q3 and the fourth power transistor Q4 in the single-phase HERIC topology circuit are alternately turned on during operation. Further, the third power transistor Q3 and the fourth power transistor Q4 both are turned on and turned off at high speed. When the third power transistor Q3 is turned on or turned off at high speed, a large overvoltage may be generated across an emitter and a collector of the third power transistor Q3. If the generated overvoltage is not absorbed, the overvoltage may directly be applied to the third power transistor Q3, affecting normal operation of the third power transistor Q3.

Similarly, when the fourth power transistor Q4 is turned on or turned off at high speed, the same situation may occur.

It should be further noted that the circuit shown in FIG. 1 or FIG. 2 is a single-phase HERIC topology circuit in an inverter, that is, the circuit mainly involved in the present disclosure. Other circuits in the inverter are the same as those in the conventional technology and are therefore not shown in the drawings.

Based on the above single-phase HERIC topology, specific embodiments of the present disclosure are described below with reference to schematic diagrams of the structure of the overvoltage absorption circuit.

Figure 3:
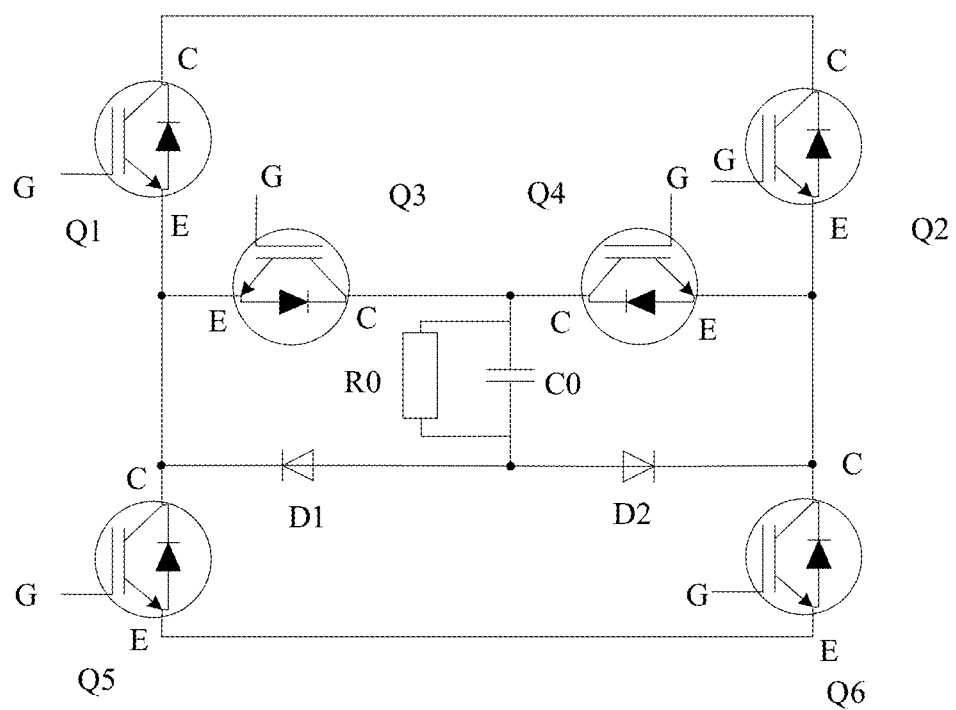
FIG. 3 shows an overvoltage absorption circuit according to an embodiment of the present disclosure.
Figure 4:
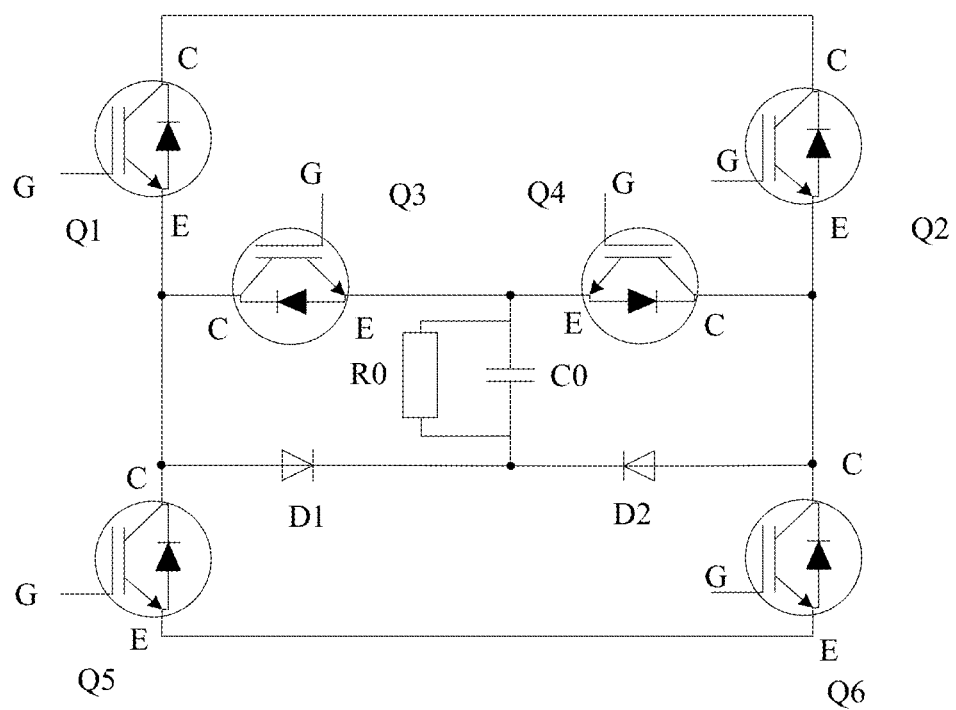
FIG. 4 shows an overvoltage absorption circuit according to another embodiment of the present disclosure.

Reference is made to FIG. 3 or FIG. 4, the overvoltage absorption circuit according to an embodiment of the present disclosure includes a clamping capacitor C0, an absorption resistor R0, a first diode D1 and a second diode D2.

It should be noted that each of the first diode D1 and the second diode D2 in the overvoltage absorption circuit may be a silicon carbide (SIC) diode or a fast recovery diode, which depends on specific application scenarios. Preferably, each of the first diode D1 and the second diode D2 is the SIC diode.

Specifically, in the embodiment as shown in FIG. 3, the clamping capacitor C0, the absorption resistor R0, the first diode D1 and the second diode D2 are connected as follows.

One terminal of the clamping capacitor C0 and one terminal of the absorption resistor R0 are both connected to collectors of two cross transistors in the single-phase HERIC topology.

The two cross transistors in the single-phase HERIC topology are a third power transistor Q3 and a fourth power transistor Q4 in FIG. 3. The collectors of the two cross transistors in the single-phase HERIC topology are collectors of the third power transistor Q3 and the fourth power transistor Q4.

It should be noted that one terminal of the clamping capacitor C0 is connected to the collectors of the two cross transistors in the single-phase HERIC topology, to absorb CE (collector-emitter) voltages of the cross transistors in the single-phase HERIC topology.

The other terminal of the clamping capacitor C0 and the other terminal of the absorption resistor R0 are each connected to one terminal of the first diode D1 and one terminal of the second diode D2.

The other terminal of the first diode D1 is connected to an emitter of one of the two cross transistors.

It should be noted that one of the two cross transistors connected to the other terminal of the first diode D1 may be the third power transistor Q3 or the fourth power transistor Q4. In the present disclosure, the cross transistor connected to the other terminal of the first diode D1 is the third power transistor Q3, for example.

A case that the cross transistor connected to the other terminal of the first diode D1 is the fourth power transistor Q4 is similar to the case that the cross transistor connected to the other terminal of the first diode D1 is the third power transistor Q3, for which reference may be made to the embodiments in this disclosure and therefore no description is made redundantly herein.

In a case that one of the two cross transistors connected to the other terminal of the first diode D1 is the third power transistor Q3, the other terminal of the first diode D1 is connected to an emitter of the third power transistor Q3.

In the embodiment shown in FIG. 3, an anode of the first diode D1 is connected to the clamping capacitor C0. A cathode of the first diode D1 is connected to the emitter of the cross transistor that is connected to the first diode. An anode of the second diode D2 is connected to the clamping capacitor C0. A cathode of the second diode D2 is connected to the emitter of the cross transistor that is connected to the second diode.

In a case that the cross transistor connected to the cathode of the first diode D1 is the third power transistor Q3, it means that the cathode of the first diode D1 is connected to the emitter of the third power transistor Q3 (as shown in FIG. 3). In a case that the cross transistor connected to the cathode of the second diode D2 is the fourth power transistor Q4, it means that the cathode of the second diode D2 is connected to the emitter of the fourth power transistor Q4 (as shown in FIG. 3).

The other terminal of the second diode D2 is connected to an emitter of the other of the two cross transistors.

It should be noted that the other of the two cross transistors connected to the other terminal of the second diode D2 may be the fourth power transistor Q4 or the third power transistor Q3. In the present disclosure, the cross transistor connected to the other terminal of the second diode D2 is the fourth power transistor Q4, for example.

A case that the cross transistor connected to the other terminal of the second diode D2 is the third power transistor Q3 is similar to the case that the cross transistor connected to the other terminal of the second diode D2 is the fourth power transistor Q4, for which reference may be made to the embodiments of the present disclosure and therefore no description is made redundantly herein.

In a case that one of the two cross transistors connected to the other terminal of the second diode D2 is the fourth power transistor Q4, the other terminal of the second diode D2 is connected to the emitter of the fourth power transistor Q4.

Specifically, in the embodiment as shown in FIG. 4, the clamping capacitor C0, the absorption resistor R0, the first diode D1 and the second diode D2 are connected as follows.

One terminal of the clamping capacitor C0 and one terminal of the absorption resistor R0 are both connected to emitters of two cross transistors in the single-phase HERIC topology.

The two cross transistors in the single-phase HERIC topology are a third power transistor Q3 and a fourth power transistor Q4 in FIG. 4. The emitters of the two cross transistors in the single-phase HERIC topology are emitters of the third power transistor Q3 and the fourth power transistor Q4.

It should be noted that one terminal of the clamping capacitor C0 is connected to the emitters of the two cross transistors in the single-phase HERIC topology, to absorb CE (collector-emitter) voltages of the cross transistors in the single-phase HERIC topology.

The other terminal of the clamping capacitor C0 and the other terminal of the absorption resistor R0 are each connected to one terminal of the first diode D1 and one terminal of the second diode D2.

The other terminal of the first diode D1 is connected to a collector of one of the two cross transistors.

It should be noted that one of the two cross transistors connected to the other terminal of the first diode D1 may be the third power transistor Q3 or the fourth power transistor Q4. In the present disclosure, the cross transistor connected to the other terminal of the first diode D1 is the third power transistor Q3, for example.

A case that the cross transistor connected to the other terminal of the first diode D1 is the fourth power transistor Q4 is similar to the case that the cross transistor connected to the other terminal of the first diode D1 is the third power transistor Q3, for which reference may be made to the embodiments in this disclosure and therefore no description is made redundantly herein.

In a case that one of the two cross transistors connected to the other terminal of the first diode D1 is the third power transistor Q3, the other terminal of the first diode D1 is connected to a collector of the third power transistor Q3.

In the embodiment shown in FIG. 4, a cathode of the first diode D1 is connected to the clamping capacitor C0. An anode of the first diode D1 is connected to the collector of the cross transistor that is connected to the first diode. A cathode of the second diode D2 is connected to the clamping capacitor C0. An anode of the second diode D2 is connected to the collector of the cross transistor that is connected to the second diode.

In a case that the cross transistor connected to the anode of the first diode D1 is the third power transistor Q3, it means that the anode of the first diode D1 is connected to the collector of the third power transistor Q3 (as shown in FIG. 4). In a case that the cross transistor connected to the anode of the second diode D2 is the fourth power transistor Q4, it means that the anode of the second diode D2 is connected to the collector of the fourth power transistor Q4 (as shown in FIG. 4).

The other terminal of the second diode D2 is connected to a collector of the other of the two cross transistors.

It should be noted that the other of the two cross transistors connected to the other terminal of the second diode D2 may be the fourth power transistor Q4 or the third power transistor Q3. In the present disclosure, the cross transistor connected to the other terminal of the second diode D2 is the fourth power transistor Q4, for example.

A case that the cross transistor connected to the other terminal of the second diode D2 is the third power transistor Q3 is similar to the case that the cross transistor connected to the other terminal of the second diode D2 is the fourth power transistor Q4, for which reference may be made to the embodiments of the present disclosure and therefore no description is made redundantly herein.

In a case that one of the two cross transistors connected to the other terminal of the second diode D2 is the fourth power transistor Q4, the other terminal of the second diode D2 is connected to the collector of the fourth power transistor Q4.

With reference to FIG. 3, a specific operation process of the above overvoltage absorption circuit is described as follows.

When any one of the two cross transistors (namely, the third power transistor Q3 and the fourth power transistor Q4) in the single-phase HERIC topology has an overvoltage, for example, the third power transistor Q3 has an overvoltage, that is, the overvoltage is generated across the emitter and the collector of the third power transistor Q3, the clamping capacitor C0 is changed via the first diode D1, and the overvoltage across the emitter and the collector of the third power transistor Q3 is clamped at a safe value due to the fact that a voltage across a capacitor cannot change abruptly.

The absorption resistor R0 is configured to release energy stored in the clamping capacitor C0, so as to maintain a stable-state operating voltage of the clamping capacitor at a proper level to guarantee absorption performance.

In a case that an overvoltage occurs in the fourth power transistor Q4, the overvoltage can be absorbed by the overvoltage absorption circuit in a way similar to the case that an overvoltage occurs in the third power transistor Q3 as described above.

Compared with conventional technology, in case of the same absorption performance, the operating loss by the technical solution according to the present disclosure is significantly less than that in the conventional technology, because the loss by the technical solution according to the present disclosure is mainly spike energy with substantially no additional loss while the conventional absorption circuit has additional loss that is inevitable. Therefore, the present disclosure provides significant technical advantages.

It should be noted that there is also an RCD type overvoltage absorption circuit in the conventional technology, as shown in FIG. 2. In the overvoltage absorption circuit, an anode of a first diode D1 is connected to a collector of the third power transistor Q3, a cathode of the first diode D1 is connected to one terminal of a capacitor C1, the other terminal of the capacitor C1 is connected to an emitter of the third power transistor Q3, and the first diode D1 is connected in parallel with a resistor R390; an anode of a second diode D2 is connected to a collector of a fourth power transistor Q4, a cathode of the second diode D2 is connected to one terminal of a capacitor C2, the other terminal of the capacitor C2 is connected to an emitter of the fourth power transistor Q4, and a resistor R392 is also connected in parallel across the diode D2, so as to absorb the overvoltage.

Compared with the overvoltage absorption circuit shown in FIG. 1, in the RCD type overvoltage absorption circuit, a loss of the absorption resistor is optimized, thereby ensuring the absorption effect while containing the loss of the absorption circuit. However, the RCD type overvoltage absorption circuit includes too many components, thus cannot be applied to a product with a high power density. Further, application of the RCD type absorption circuit may result in high cost of the entire circuit due to the too many components.

The overvoltage absorption circuit according to this embodiment includes fewer components, which can solve the problem that the RCD type overvoltage absorption circuit cannot be applied to the product with a high power density due to the too many components. Further, since the overvoltage absorption circuit according to this embodiment includes fewer components, the cost of application of the overvoltage absorption circuit can be reduced, thereby solving the problem of high cost of the entire circuit due to the too many components. Therefore, the solution according to this embodiment is better than the solution shown in FIG. 2 and is more conducive to practical application.

Figure 5:
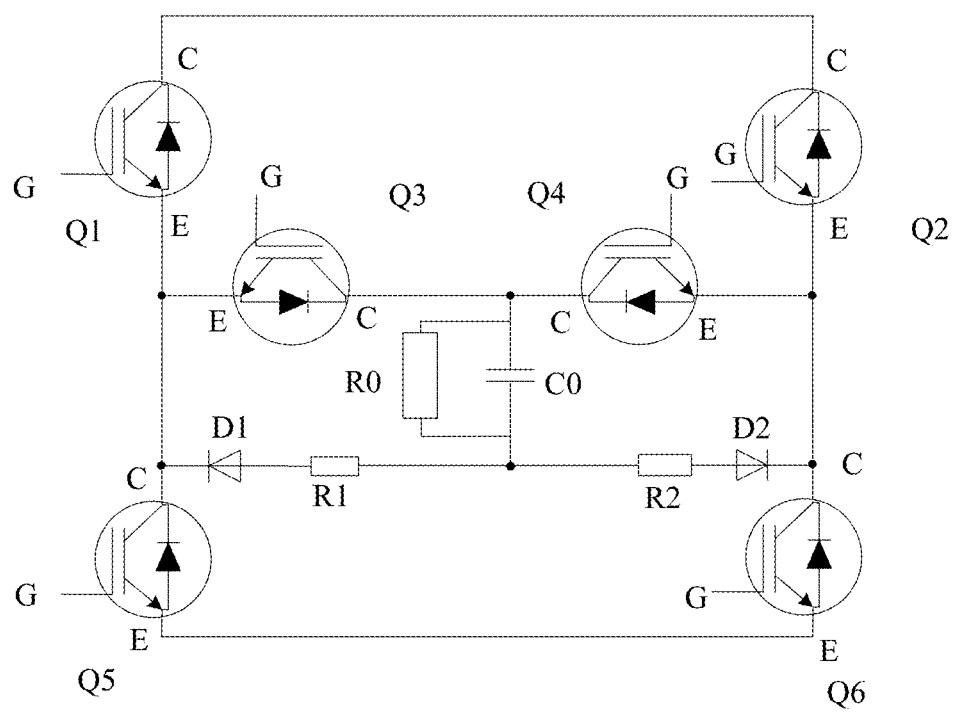
FIG. 5 shows an overvoltage absorption circuit according to another embodiment of the present disclosure.

In another embodiment of the present disclosure, as shown in FIG. 5, the overvoltage absorption circuit further includes a first resistor R1 and a second resistor R2.

One terminal of the first resistor R1 is connected to the anode of the first diode D1. The other terminal of the first resistor R1 is connected to the terminal of the clamping capacitor C0 and the terminal of the absorption resistor R0 that are farther from the collectors of the two cross transistors.

One terminal of the second resistor R2 is connected to the anode of the second diode D2. The other terminal of the second resistor R2 is connected to the terminal of the clamping capacitor C0 and the terminal of the absorption resistor R0 that are farther from the collectors of the two cross transistors.

It should be noted that each of the first resistor R1 and the second resistor R2 may be formed by multiple resistors connected in series. The first resistor R1 and the second resistor R2 in the overvoltage absorption circuit are used to limit surge currents of the first diode and the second diode.

It should be further noted that types of the first resistor R1 and the second resistor R2 may be determined depending on the application scenarios of the circuit. Generally, the first resistor R1 and the second resistor R2 have the same type.

Figure 6:
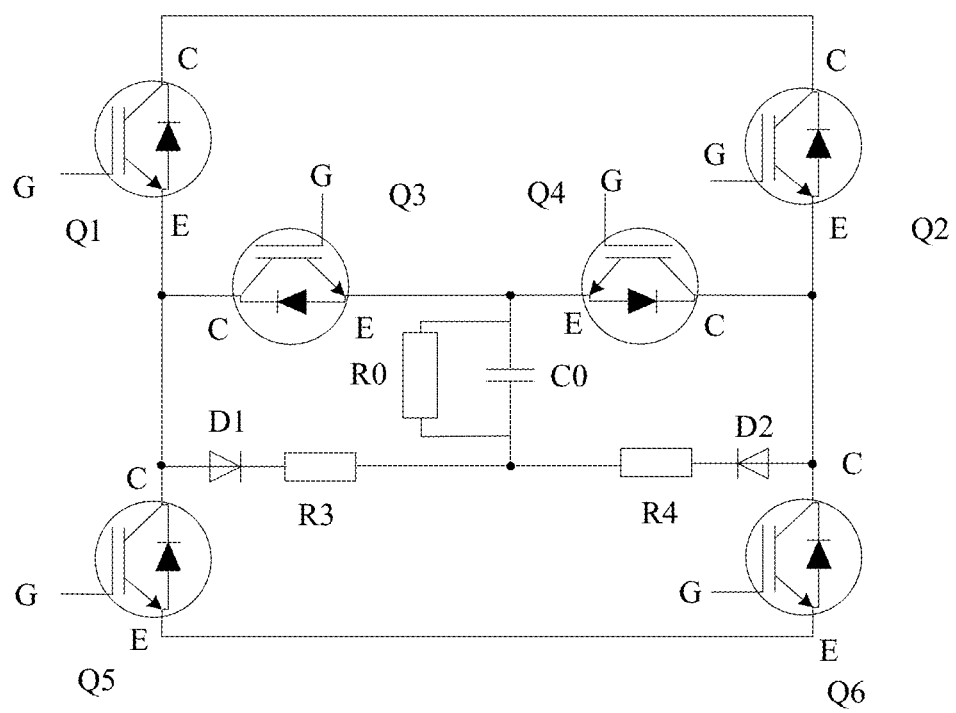
FIG. 6 shows an overvoltage absorption circuit according to another embodiment of the present disclosure.

In another embodiment of the present disclosure, as shown in FIG. 6, the overvoltage absorption circuit further includes a third resistor R3 and a fourth resistor R4.

One terminal of the third resistor R3 is connected to the cathode of the first diode D1. The other terminal of the third resistor R3 is connected to the terminal of the clamping capacitor C0 and the terminal of the absorption resistor R0 that are farther from the emitters of the two cross transistors.

One terminal of the fourth resistor R4 is connected to the cathode of the second diode D2. The other terminal of the fourth resistor R4 is connected to the terminal of the clamping capacitor C0 and the terminal of the absorption resistor R0 that are farther from the emitters of the two cross transistors.

It should be noted that each of the third resistor R3 and the fourth resistor R4 may be formed by multiple resistors connected in series. The third resistor R3 and the fourth resistor R4 in the overvoltage absorption circuit are used to limit surge currents of the first diode and the second diode.

It should be further noted that types of the third resistor R3 and the fourth resistor R4 may be determined depending on the application scenarios of the circuit. Generally, the third resistor R3 and the fourth resistor R4 have the same type.

Figure 7:
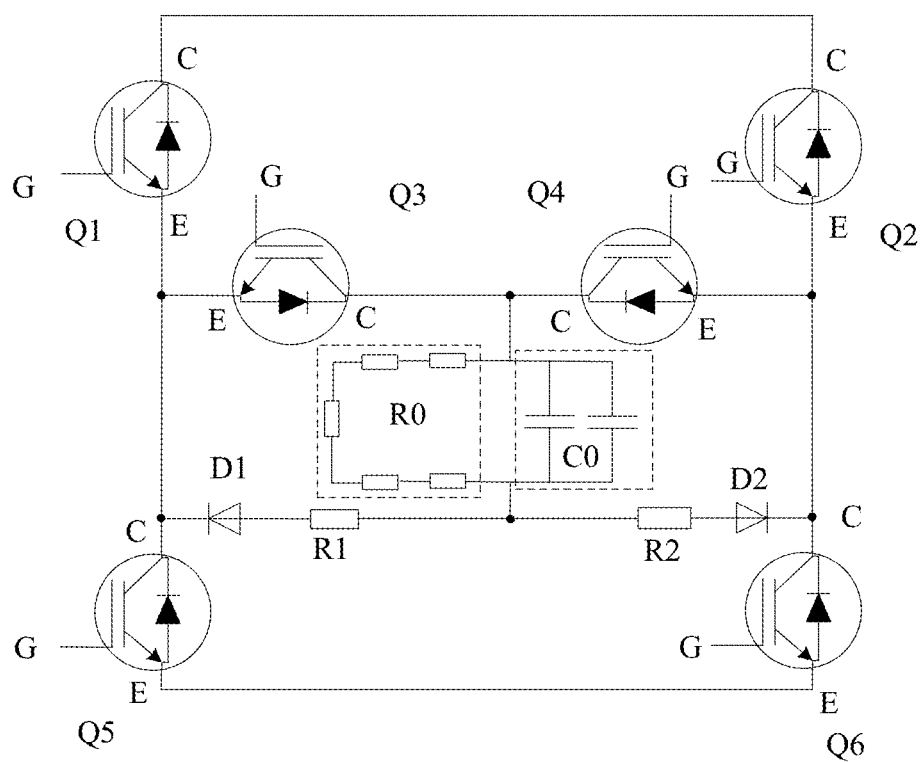
FIG. 7 shows an overvoltage absorption circuit in a topology circuit of an SHSKHV inverter unit according to another embodiment of the present disclosure.

The overvoltage absorption circuit according to the present disclosure may also be applied to a topology circuit of an SHSKHV inverter unit, as shown in FIG. 7. The topology circuit of the SH5KHV inverter unit includes 6 power transistors, namely, a first power transistor Q1, a second power transistor Q2, a third power transistor Q3, a fourth power transistor Q4, a fifth power transistor Q5 and a sixth power transistor Q6. The third power transistor Q3 and the fourth power transistor Q4 may have a high overvoltage during use, which exceeds 650V. The problem of high overvoltage must be solved in order to use a 650V power transistor.

By properly setting a capacitance value of the clamping capacitor and resistance values of resistors in the overvoltage absorption circuit, the voltage of the clamping capacitor can be kept constant during the process that the third power transistor Q3 and the fourth power transistor Q4 are turned on or turned off at high speed, thereby achieving constant voltage stress of the third power transistor Q3 and the fourth power transistor Q4.

Specifically, in the overvoltage absorption circuit of the third power transistor Q3 and the fourth power transistor Q4 in the topology circuit of the SH5KHV inverter unit, the clamping capacitor C0 is formed by two capacitors connected in parallel. The absorption resistor R0 is formed by five resistors connected in series, so as to absorb overvoltage generated by the third power transistor Q3 and the fourth power transistor Q4 during use, such that the voltage between the collector and the emitter of any one of the third power transistor Q3 and the fourth power transistor Q4 can be controlled at a safe value, thereby achieving the constant voltage stress of the third power transistor Q3 and the fourth power transistor Q4.

Furthermore, the overvoltage generated by the third power transistor Q3 and the fourth power transistor Q4 may be contained within a safe value by setting a capacitance value of the clamping capacitor, a resistance value of the absorption resistor R0 and types of the first diode D1 and the second diode D2 in the overvoltage absorption circuit connected to the third power transistor Q3 and the fourth power transistor Q4, thereby ensuring the application of the 650V power transistor in the topology circuit of the SH5KHV inverter unit.

It should be noted that the overvoltage absorption circuit in this embodiment is provided for the case that the 650V power transistor cannot be applied to the topology circuit of the SH5KHV inverter unit, so as to achieve constant voltage of the clamping capacitor during the process that the third power transistor Q3 and the fourth power transistor Q4 are turned on or turned off at high speed by properly setting the capacitance value of the clamping capacitor and the resistance values of resistors, thereby achieving the constant voltage stress of the third power transistor Q3 and the fourth power transistor Q4. In this way, the 650V power transistor can be applied to the topology circuit of the SH5KHV inverter unit. For topology circuits of other types of inverter units, a connection manner between the clamping capacitor C0 and the absorption resistor R0, and the numbers of the clamping capacitor C0 and the absorption resistor R0, as well as the parameters of the clamping capacitor C0, the absorption resistor R0 and the diodes, may be adjusted based on the overvoltage absorption circuit according to the present disclosure, so as to obtain overvoltage absorption circuits applicable to the topology circuits of other types of inverter units. The connection manner between the clamping capacitor C0 and the absorption resistor R0, the numbers of the clamping capacitor C0 and the absorption resistor R0, as well as the parameters of the clamping capacitor C0, the absorption resistor R0 and the diodes, are not limited in this disclosure, and overvoltage absorption circuits with all kinds of connection manners between the clamping capacitor C0 and the absorption resistor R0, numbers of the clamping capacitor C0 and the absorption resistor R0, as well as parameters of the clamping capacitor C0, the absorption resistor R0 and the diodes, fall within the protection scope of the present disclosure.

Figure 8:
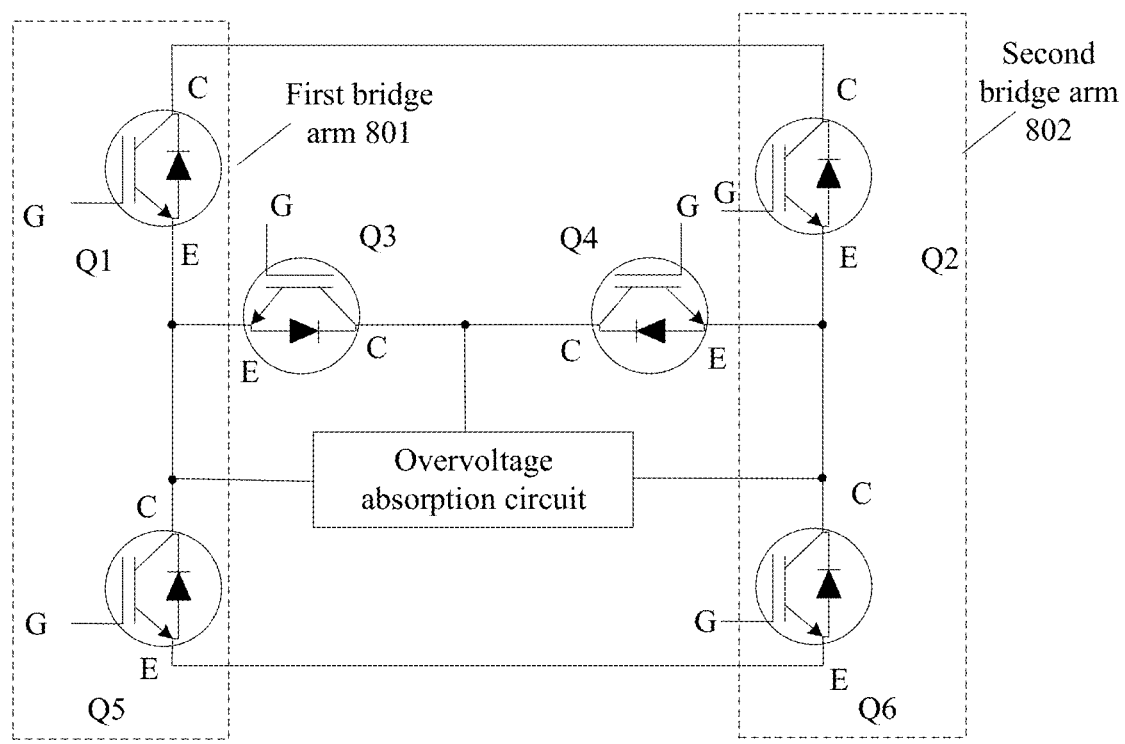
FIG. 8 shows a single-phase HERIC topology according to an embodiment of the present disclosure.

A single-phase HERIC topology is further provided according to an embodiment of the present disclosure, as shown in FIG. 8. The single-phase HERIC topology includes two bridge arms, two cross transistors connected in series between intermediate points of the two bridge arms, and the overvoltage absorption circuit according to any one of the above embodiments.

It should be noted that the two bridge arms are the first bridge arm 801 and the second bridge arm 802 shown in FIG. 8. As shown in FIG. 8, the first bridge arm 801 includes a first power transistor Q1 and a fifth power transistor Q5, and the second bridge arm 802 includes a second power transistor Q2 and a sixth power transistor Q6. The two cross transistors are the third power transistor Q3 and the fourth power transistor Q4 shown in FIG. 8.

It should further be noted that each of the six cross transistors, that is, the two cross transistors Q3 and Q4, the first power transistor Q1, the second power transistor Q2, the fifth power transistor Q5 and the sixth power transistor Q6, in the single-phase HERIC topology may be an insulated gate bipolar transistor (IGBT), or a metal oxide semiconductor (MOS) field effect transistor. Alternatively, each of the two cross transistors in the single-phase HERIC topology may be any other power transistor in the conventional technology. A specific type of the two cross transistors in the single-phase HERIC topology is not limited herein, and all types fall within the protection scope of the present disclosure. In a case that the six power transistors are MOS transistors, the collector and the emitter referred to in this present disclosure may be adapted to a drain and a source of a MOS transistor, respectively.

Based on the above description of the disclosed embodiments, those skilled in the art can implement or carry out the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

It should be further noted that the relationship terminologies such as first, second or the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

The invention claimed is:

1. An overvoltage absorption circuit applied to a single-phase HERIC topology, the overvoltage absorption circuit comprising:

a first diode, and a second diode, and a first sub-circuit comprising a clamping capacitor and an absorption resistor connected in parallel with each other, wherein the first sub-circuit has a first terminal connected to a first point of common coupling of a first cross transistor and a second transistor in the single-phase HERIC topology, and a second terminal connected to a second point of common coupling of the first diode and the second diode;

the first diode has a third terminal connected to the second point of common coupling, and a fourth terminal that is connected to the first cross transistor and further connected to the first point of common coupling through the first cross transistor; and the second diode has a fifth terminal connected to the second point of common coupling, and a sixth terminal that is connected to the second cross transistor and further connected to the first point of common coupling through the second cross transistor.

2. The overvoltage absorption circuit according to claim 1, wherein the third terminal of the first diode is an anode of the first diode, and the fourth terminal of the first diode is a cathode of the first diode;

the fifth terminal of the second diode is an anode of the second diode, and the sixth terminal of the second diode is a cathode of the second diode;

the cathode of the first diode is connected to an emitter of the first cross transistor, and the cathode of the second diode is connected to an emitter of the second cross transistor; and the first terminal of the first sub-circuit is connected to a collector of the first cross transistor and a collector of the second cross transistor through the first point of common coupling.

3. The overvoltage absorption circuit according to claim 1, wherein the third terminal of the first diode is a cathode of the first diode, and the fourth terminal of the first diode is an anode of the first diode;

the fifth terminal of the second diode is a cathode of the second diode, and the sixth terminal of the second diode is an anode of the second diode;

the anode of the first diode is connected to a collector of the first cross transistor, and the anode of the second diode is connected to a collector of the second cross transistor; and the first terminal of the first sub-circuit is connected to an emitter of the first cross transistor and an emitter of the second cross transistor through the first point of common coupling.

4. The overvoltage absorption circuit according to claim 2, further comprising:

a first resistor; and a second resistor, wherein one terminal of the first resistor is connected to the anode of the first diode, and the other terminal of the first resistor is connected to the second point of common coupling; and one terminal of the second resistor is connected to the anode of the second diode, and the other terminal of the second resistor is connected to the second point of common coupling.

5. The overvoltage absorption circuit according to claim 3, further comprising:

a third resistor; and a fourth resistor, wherein one terminal of the third resistor is connected to the cathode of the first diode, and the other terminal of the third resistor is connected to the second point of common coupling; and one terminal of the fourth resistor is connected to the cathode of the second diode, and the other terminal of the fourth resistor is connected to the second point of common coupling.

6. The overvoltage absorption circuit according to claim 1, wherein the clamping capacitor comprises two capacitors connected in parallel.

7. The overvoltage absorption circuit according to claim 1, wherein the absorption resistor comprises a plurality of resistors connected in series.

8. The overvoltage absorption circuit according to claim 1, wherein each of the first diode and the second diode is a silicon carbide (SIC) diode, or a fast recovery diode.

9. A single-phase HERIC topology, comprising:

a first bridge arm and a second bridge arm, where the first bridge arm comprises a first power transistor and a fifth power transistor, and the second bridge arm comprises a second power transistor and a sixth power transistor;

a first cross transistor and a second cross transistor that are connected in series between intermediate points of the first and second bridge arms; and an overvoltage absorption circuit comprising: a first diode, and a second diode, and a first sub-circuit comprising a clamping capacitor and an absorption resistor connected in parallel with each other, wherein the first sub-circuit has a first terminal connected to a first point of common coupling of the first cross transistor and the second transistor in the single-phase HERIC topology, and a second terminal connected to a second point of common coupling of the first diode and the second diode;

the first diode has a third terminal connected to the second point of common coupling, and a fourth terminal that is connected to the first cross transistor and further connected to the first point of common coupling through the first cross transistor; and the second diode has a fifth terminal connected to the second point of common coupling, and a sixth terminal that is connected to the second cross transistor and further connected to the first point of common coupling through the second cross transistor.

10. The single-phase HERIC topology according to claim 9, wherein the third terminal of the first diode is an anode of the first diode, the fourth terminal of the first diode is a cathode of the first diode;

the fifth terminal of the second diode is an anode of the second diode, and the sixth terminal of the second diode is a cathode of the second diode;

the cathode of the first diode is connected to an emitter of the first cross transistor, and the cathode of the second diode is connected to an emitter of the second cross transistor; and the first terminal of the first sub-circuit is connected to a collector of the first cross transistor and a collector of the second cross transistor through the first point of common coupling.

11. The single-phase HERIC topology according to claim 9, wherein the third terminal of the first diode is a cathode of the first diode, and the fourth terminal of the first diode is an anode of the first diode;

the fifth terminal of the second diode is a cathode of the second diode, and the sixth terminal of the second diode is an anode of the second diode;

the anode of the first diode is connected to a collector of the first cross transistor, and the anode of the second diode is connected to a collector of the second cross transistor; and the first terminal of the first sub-circuit is connected to an emitter of the first cross transistor and an emitter of the second cross transistor through the first point of common coupling.

12. The single-phase HERIC topology according to claim 10, wherein the overvoltage absorption circuit further comprises:

a first resistor; and a second resistor, wherein one terminal of the first resistor is connected to the anode of the first diode, and the other terminal of the first resistor is connected to the second point of common coupling; and one terminal of the second resistor is connected to the anode of the second diode, and the other terminal of the second resistor is connected to the second point of common coupling.

13. The single-phase HERIC topology according to claim 11, wherein the overvoltage absorption circuit further comprises:

a third resistor; and a fourth resistor, wherein one terminal of the third resistor is connected to the cathode of the first diode, and the other terminal of the third resistor is connected to the second point of common coupling; and one terminal of the fourth resistor is connected to the cathode of the second diode, and the other terminal of the fourth resistor is connected to the second point of common coupling.

14. The single-phase HERIC topology according to claim 9, wherein the clamping capacitor comprises two capacitors connected in parallel.

15. The single-phase HERIC topology according to claim 9, wherein the absorption resistor comprises a plurality of resistors connected in series.

16. The single-phase HERIC topology according to claim 9, wherein each of the first diode and the second diode is a silicon carbide (SIC) diode, or a fast recovery diode.

17. The single-phase HERIC topology according to claim 9, wherein each of the first power transistor, the second power transistor, the fifth power transistor, the sixth power transistor, the first cross transistor and the second cross transistor is an insulated gate bipolar transistor (IGBT) or a metal oxide semiconductor (MOS) field effect transistor.

* * * * *